United States Patent
Ohr

(10) Patent No.: US 10,337,563 B2
(45) Date of Patent: Jul. 2, 2019

(54) WEDGE CLUTCH WITH BREAKER RING

(71) Applicant: SCHAEFFLER TECHNOLOGIES AG & CO. KG, Herzogenaurach (DE)

(72) Inventor: Carsten Ohr, Charlotte, NC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 100 days.

(21) Appl. No.: 15/629,846

(22) Filed: Jun. 22, 2017

(65) Prior Publication Data
US 2018/0372169 A1    Dec. 27, 2018

(51) Int. Cl.
| F16D 13/14 | (2006.01) |
| F16D 23/14 | (2006.01) |
| F16D 125/66 | (2012.01) |
| F16D 13/75 | (2006.01) |
| F16D 15/00 | (2006.01) |
| F16D 13/16 | (2006.01) |

(52) U.S. Cl.
CPC ............. *F16D 13/14* (2013.01); *F16D 23/14* (2013.01); *F16D 13/16* (2013.01); *F16D 13/757* (2013.01); *F16D 15/00* (2013.01); *F16D 2125/66* (2013.01)

(58) Field of Classification Search
CPC ........... F16D 13/14; F16D 13/16; F16D 15/00
See application file for complete search history.

(56) References Cited

U.S. PATENT DOCUMENTS

| 1,040,866 | A * | 10/1912 | Bowen | F16D 13/16 |
| | | | | 192/101 |
| 1,434,970 | A * | 11/1922 | Taylor | F16D 15/00 |
| | | | | 192/38 |
| 9,206,861 | B2 * | 12/2015 | Russalian | F16D 27/10 |
| 9,353,802 | B2 * | 5/2016 | Lee | F16D 13/16 |
| 9,732,808 | B2 * | 8/2017 | Davis | F16D 15/00 |
| 10,006,496 | B2 * | 6/2018 | Schimpf | F16D 13/26 |
| 10,024,371 | B2 * | 7/2018 | Ohr | F16D 13/16 |
| 10,030,719 | B2 * | 7/2018 | Hartmann | F16D 41/061 |
| 10,036,429 | B2 * | 7/2018 | Ince | F16D 13/10 |
| 2014/0014455 | A1 * | 1/2014 | Davis | F16D 15/00 |
| | | | | 192/45.1 |
| 2015/0027840 | A1 * | 1/2015 | Lee | F16D 13/16 |
| | | | | 192/45.1 |
| 2015/0027843 | A1 * | 1/2015 | Russalian | F16D 27/10 |
| | | | | 192/71 |
| 2016/0084326 | A1 * | 3/2016 | Ramsey | F16D 41/063 |
| | | | | 192/45.1 |
| 2017/0058965 | A1 * | 3/2017 | Schimpf | F16D 13/26 |
| 2017/0058969 | A1 * | 3/2017 | Hartmann | F16D 41/061 |
| 2017/0089405 | A1 * | 3/2017 | Lee | F16D 15/00 |
| 2018/0038423 | A1 * | 2/2018 | Ohr | F16D 13/16 |
| 2018/0180107 | A1 * | 6/2018 | Ince | F16D 13/10 |

* cited by examiner

*Primary Examiner* — David R Morris
(74) *Attorney, Agent, or Firm* — Brooks Kushman P.C.

(57) ABSTRACT

A clutch includes a hub, a carrier defining a circular groove, and a wedge disk defining apertures and having a first edge disposed on the hub and a second edge disposed in the groove. The clutch further includes a breaker ring encircling the hub and having projections that are each received in one of the apertures. The breaker ring is slidably connected to the hub and is configured to rotate the wedge disk relative to the hub, via engagement between the projections and the apertures, in response to the breaker ring sliding towards the wedge disk.

19 Claims, 4 Drawing Sheets

WEDGE CLUTCH WITH BREAKER RING

TECHNICAL FIELD

The present disclosure relates to wedge clutches for coupling two or more components, and more specifically to a wedge clutch having a breaker ring.

BACKGROUND

A vehicle powertrain may include a wedge clutch for coupling an input shaft to an output shaft. The wedge clutch includes an inner race connected to one of the shafts and an outer race connected to the other of the shafts. A wedge disk is radially disposed between the inner and outer races and is configured to engage the inner and outer races when the clutch is locked to transmit power from the input shaft to the output shaft.

SUMMARY

According to one embodiment, a clutch includes a hub, a carrier defining a circular groove, and a wedge disk defining apertures and having a first edge disposed on the hub and a second edge disposed in the groove. The clutch further includes a breaker ring encircling the hub and having projections that are each received in one of the apertures. The breaker ring is slidably connected to the hub and is configured to rotate the wedge disk relative to the hub, via engagement between the projections and the apertures, in response to the breaker ring sliding towards the wedge disk.

According to another embodiment, a clutch includes an inner race and an outer race concentric with each other. One of the inner and outer races defines a tapered surface and the other of the inner and outer races defines a circular groove. A wedge disk is radially disposed between the inner and outer races and includes a first edge disposed on the tapered surface and a second edge disposed in the groove. The wedge disk defines apertures. A breaker ring is concentric with the inner and outer races, is rotationally synced to the inner race, and is axially movable relative to the inner race between a retracted position and an extended position. The breaker ring includes projections each received in one of the apertures. The apertures and the projections are sized such that the projections are in contact with the wedge disk when in the extended position and are not in contact with the wedge disk when in the retracted position.

According to yet another embodiment, a clutch includes a hub defining radially extending ramps, a carrier defining a circular groove, and a wedge disk radially disposed between the hub and the carrier. The wedge disk includes an inner edge seated on the hub and an outer edge disposed in the groove. The inner edge defines lobes configured to nest with the ramps when the wedge disk and the hub are rotationally aligned and to engage with the ramps to radially expand the wedge disk from a contracted position, in which the clutch is disengaged, to an expanded position, in which the clutch is engaged, when the wedge disk and the hub are rotationally misaligned. The clutch further includes a breaker ring encircling the hub and axially movable relative to the wedge disk between a retracted position and an extended position. The breaker ring is configured to rotate the wedge disk to the contracted position in response to the breaker ring being moved to the extended position.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
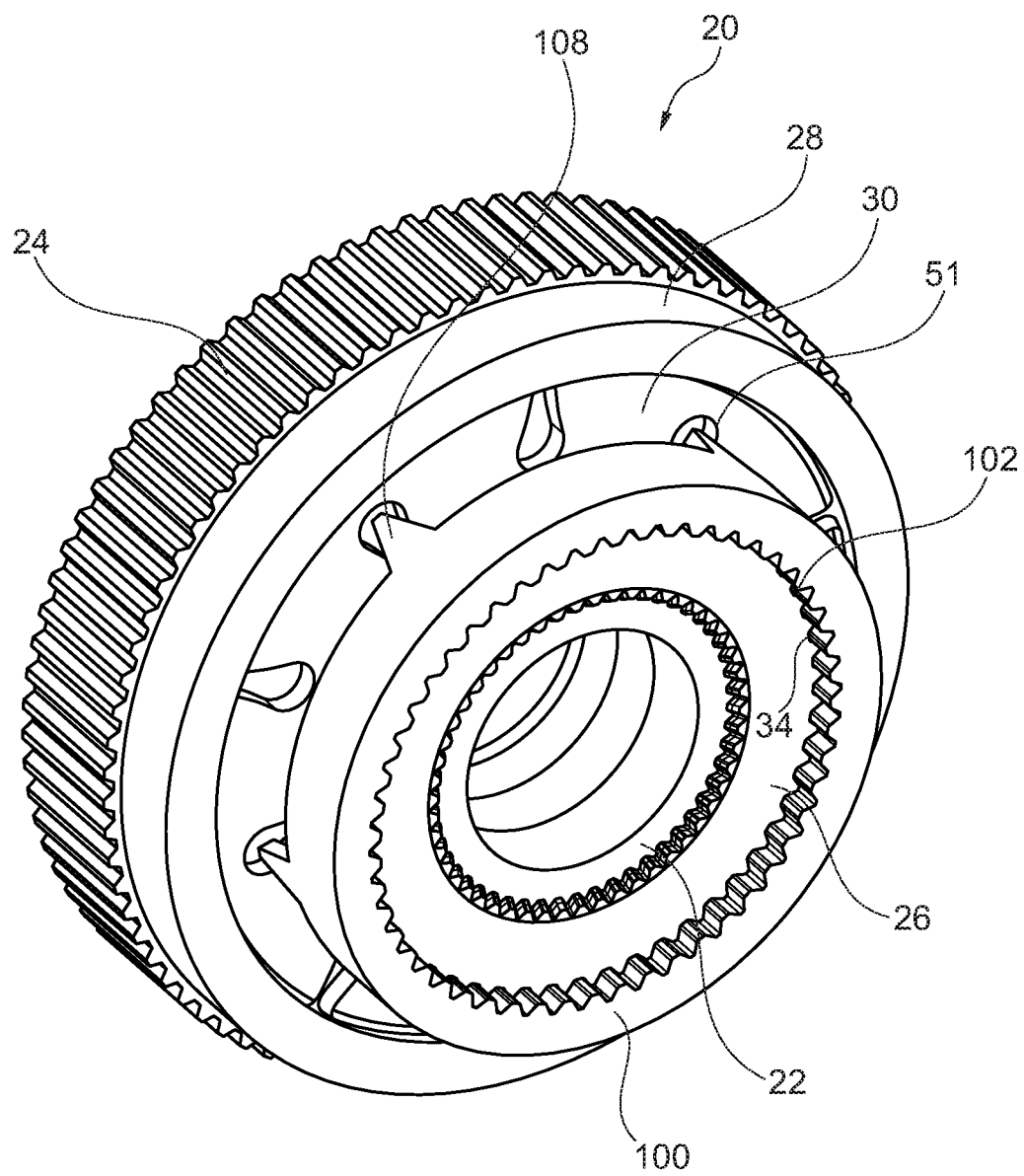
FIG. 1 is a perspective view of a wedge clutch.

Referring to FIG. 1, a wedge clutch 20 may be used to selectively couple two or more components to each other. The wedge clutch 20 may be used in one or more components of a vehicle powertrain such as in a transmission, a power-transfer unit, an axle, or a differential. In FIG. 1, the wedge clutch 20 selectively couples a shaft 22 and a ring gear 24 when the clutch is engaged and allows independent rotation of the shaft 22 and the ring gear 24 when the clutch is disengaged.

The wedge clutch 20 includes a hub 26, a carrier 28, and a wedge disk 30 radially disposed between the hub 26 and the carrier 28. In the illustrated embodiment, the hub is an inner race and the carrier is an outer race. The hub 26, the carrier 28, the wedge disk 30, and the shaft 22 are supported for rotation about a common axis. The hub 26, the carrier 28, the wedge disk 30, and the shaft 22 may be concentric—with the hub encircling the shaft 22, the wedge disk 30 encircling the hub 26, and the carrier 28 encircling the wedge disk 30. The hub 26 may be rotationally fixed to the shaft 22 by a spline connection and the carrier 28 may be fixed to the ring gear 24. In the illustrated embodiment, the carrier 28 is integrally formed with the ring gear 24. The wedge disk 30 has a resting position, e.g., contracted position, corresponding to a disengaged state of the clutch 20, and is radially expandable to lock the hub 26 and the carrier 28 when the wedge clutch 20 is engaged. Radical actuation of the wedge disk 30 will be described below in more detail.

Figures 2A, 2B:
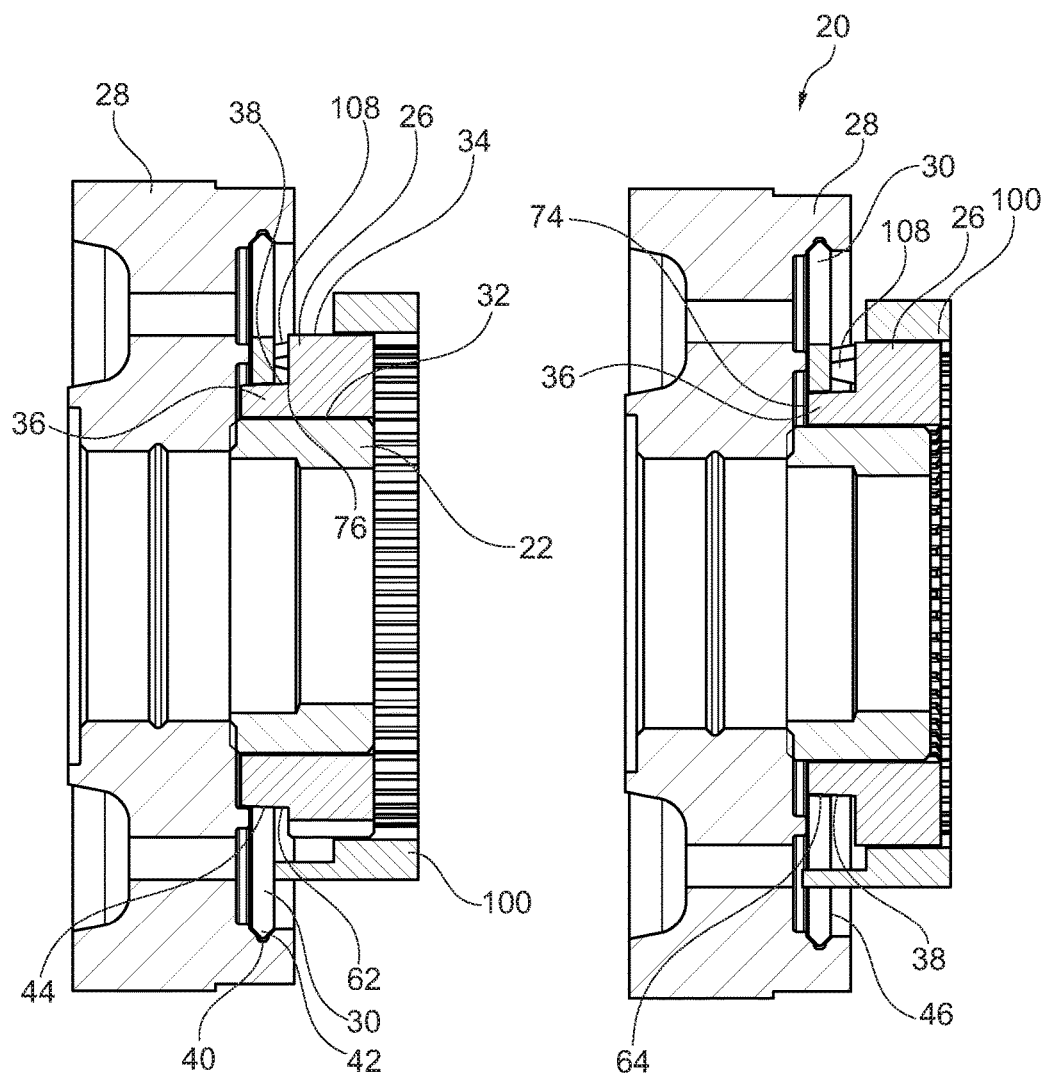
FIG. 2A is a side cross-sectional view of the wedge clutch in an engaged state.
FIG. 2B is a side cross-sectional view of the wedge clutch in a disengaged state.
Figure 3:
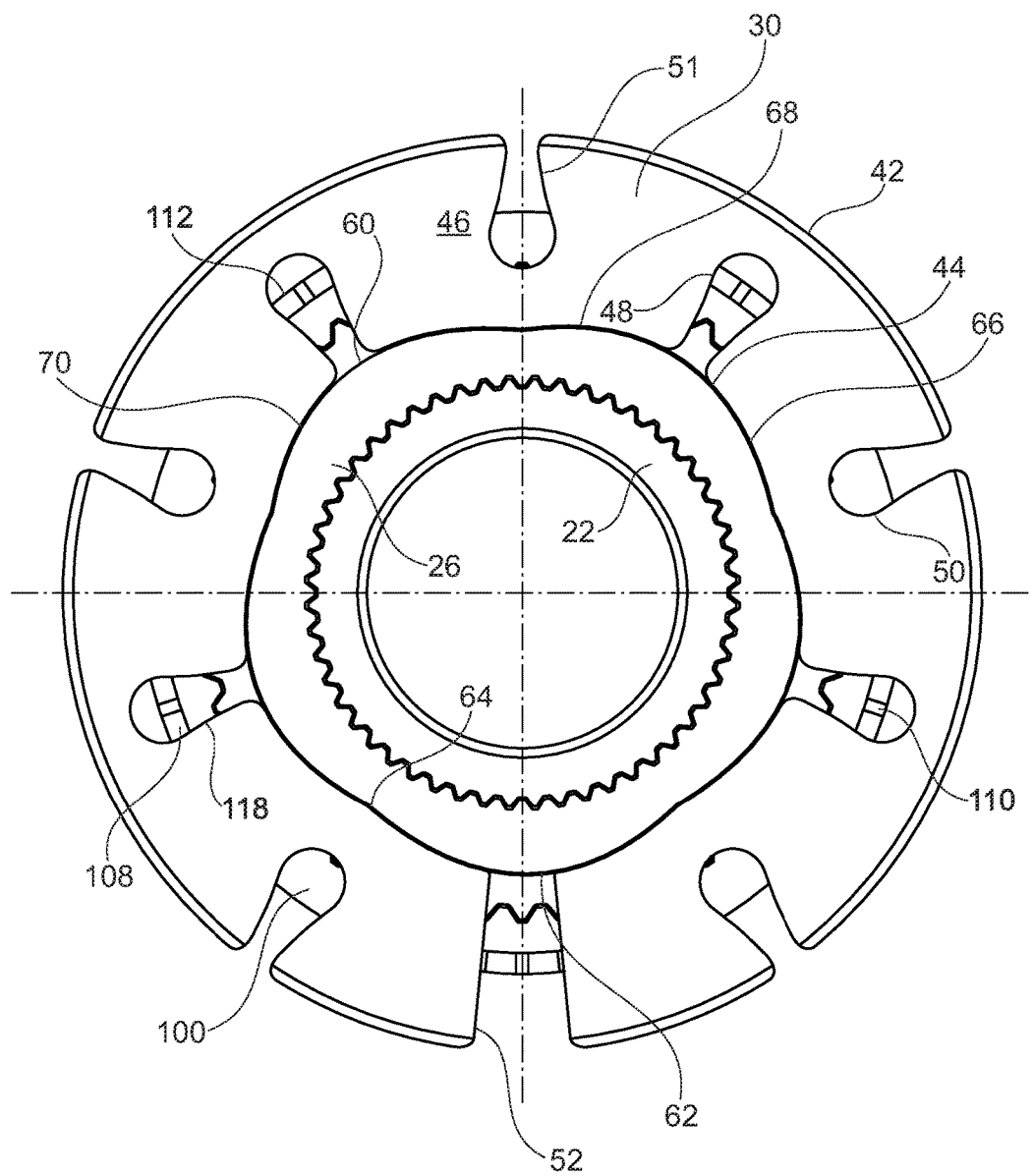
FIG. 3 is a partial back view of the wedge clutch in the disengaged state.

Referring to FIGS. 2A, 2B, and 3, the hub 26 may include an inner surface 32 seated on the shaft 22 and an outer surface 34. The hub 26 also includes a conical portion 36 having a tapered surface 38 that tapers in the axial direction as it extends from a main portion of the hub. The wedge disk 30 includes an outer edge 42, an inner edge 44, and opposing faces 46 that extend radially between the inner and outer edges. The inner edge 44 may be seated on the tapered surface 38 of the hub 26. The outer edge 42 may be disposed in a circular groove 40 defined in the carrier 28. The outer edge 42 may include a pair of slanted sides configured to engage with slanted sides of the groove 40. The slanted sides frictionally engage to lock the wedge disk 30 and the carrier 28 when the clutch 20 is engaged. In other embodiments, cross-sections of the outer edge 42 and the groove 40 may be arcuate. The hub 26 and the wedge disk 30 include features that cooperate to radially expand the disk 30 to frictionally lock the outer edge 42 with the carrier 28. These features also function to lock the inner edge 44 with the hub 26, and will now be described below.

The tapered surface 38 of the hub is not perfectly circular and includes a cammed profile 60 having ramps 62 that extend radially outward from the hub 26 and valleys 64 disposed between the ramps 62. The inner edge 44 of the disk 30 also has a cammed profile 66 having lobes 68 and peaks 70 disposed between the lobes. The lobes 68 may have a radius with a center having a location that is different than a center of the disk 30.

The cammed profiles 60 and 66 have substantially matching shapes allowing the ramps 62 to be received in the lobes 68 when the hub 26 and disk 30 are in a first rotational position, i.e., aligned, relative to each other. In the first rotational position, which corresponds to an unlocked state of the clutch 20, the wedge disk 30 is in the resting position as the cammed profiles 60, 66 are aligned. When the disk 30 and the hub 26 rotate relative to each other, the cammed profiles 60 and 66 become misalign, i.e., the ramps 62 slide into the peaks 70, causing radial expansion of the disk 30. This radial expansion causes the outer edge 42 to frictionally engage with the groove 40 of the carrier 28. The cammed profiles 60, 66 cooperate to lock the inner edge 44 with the hub 26.

The wedge disk 30 may define a plurality of apertures 51 extending through a thickness of the disk 30 between the opposing faces 46. The apertures 51 facilitate radial expansion of the disk 30. The apertures 51 may include a set of inner slots 48 and a set of outer slots 50 that are circumferentially spaced from each other. Each of the inner slots 48 may extend radially from the inner edge 44 and be elongated in a radial direction of the disk 30. Each of the outer slots 50 may extend radially from the outer edge 42 and be elongated in a radial direction of the disk 30. The apertures 51 may also include a split 52.

In FIGS. 2B and 3, the clutch 20 is illustrated in the disengaged state with the wedge disk 30 being axially positioned near a first end 74 of the conical portion 36 and being loosely disposed in the groove 40. Locking of the clutch 20 is initiated by sliding the hub 26 towards the wedge disk 30, via actuator (not shown), causing the wedge disk 30 to slide on the tapered surface 38. The increasing diameter of the tapered surface 38 slightly expands the disk 30 as it moves towards the second end 76 of the conical portion 36 creating friction between the disk 30 and the carrier 28. The friction force between the carrier 28 and the wedge disk 30 decelerates the wedge disk 30 causing relative rotation between the wedge disk 30 and the hub 26. When the wedge disk 30 and the hub 26 rotate relative to each other, the cammed profiles 60 and 66 become misaligned to further radially expand the wedge disk 30 substantially increasing the frictional engagement with the groove 40 causing the clutch 20 to lock. The clutch 20 is considered locked when the rotational speed difference between the hub 26 and the carrier 28 approximates zero.

It is possible to disengage the wedge clutch 20 by retracting the hub 26 from the wedge disk 30 to place the inner edge 44 on a smaller diameter portion of the tapered surface 38. This may sufficiently reduce the friction force between the outer edge 42 and the carrier 28 allowing the cammed profiles 60, 66 to naturally realign permitting the disk 30 to return to the contracted position. This disengagement technique is reliable when clutch torque is lower or during a torque reversal, but can be unreliable when the clutch torque is higher. A breaker ring may be utilized to reliably disengage the wedge clutch 20 while under load.

Figure 4:
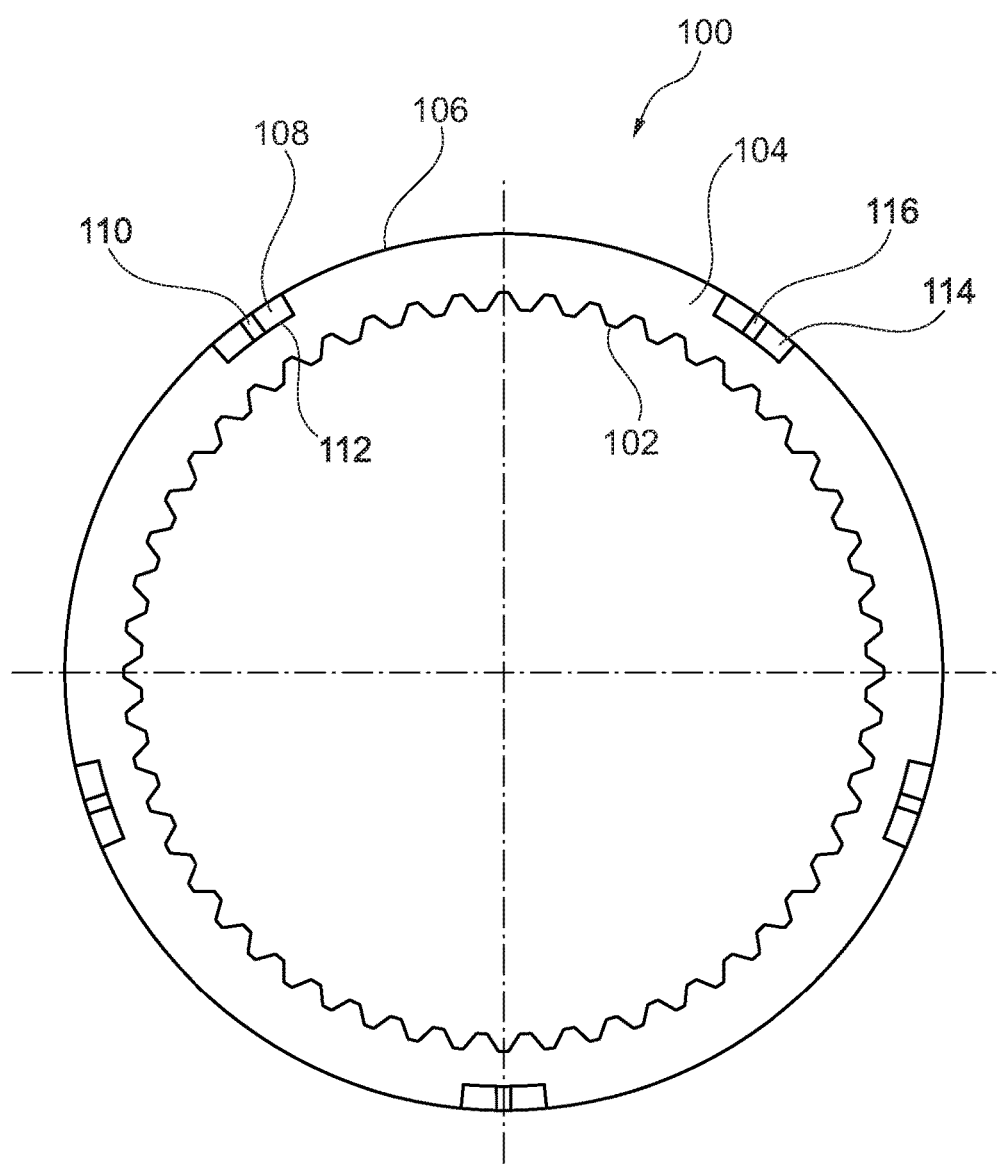
FIG. 4 is a front view of a breaker ring of the wedge clutch.

Referring to FIGS. 1 and 4, the wedge clutch 20 includes a breaker ring 100 operable to rotate the lobes 68 of the wedge disk 30 into realignment with the ramps 62 of the hub 26 to disengage the clutch 20. The breaker ring 100 may be concentric with the hub 26. The breaker ring 100 may encircle the hub 26 and be radially disposed between the hub 26 and the carrier 28. The breaker ring 100 is rotationally synced with the hub 26 and is axially movable relative to the hub 26 between a retracted position and an extended position. For example, an inner surface 102 of the breaker ring 100 may be splined to the outer surface 34 of the hub.

The breaker ring 100 may include a face 104 that extends between the inner surface 102 and an outer surface 106. A plurality of projections 108 may extend from the face 104. In the illustrated embodiment, the projections have an arrow-head like shape. Each of these projections 108 may include a base 112 and a tip 110 that is narrower than the base 112. The tip 110 may include a flat nose 116. Each projection 108 may also include a pair of opposing slanted sides 114 that extend from opposing sides of the nose 116 to opposing sides of the base 112.

Referring to FIG. 3, the projections 108 are circumferentially arranged around the breaker ring 100 to align with the apertures 51 of the disk 30, e.g., inner slots 48 and split 52. For example, the centerlines of the noses 116 may align with the centerlines of the apertures when the cammed profiles 60, 66 are aligned. The apertures have a width, at the location where the projections lie, that is wider than the tips 110 and is narrower than the bases 112. This allows the projections 108 to be at least partially inserted into the apertures 51 without engaging a periphery 118 of the apertures when the cammed profiles 60, 66 are aligned. The apertures 51 and the projections 108 may be sized so that the wedge disk 30 can rotate relative to the hub 26 to lock the clutch 20 when the breaker ring 100 is in the retracted position and so that the wedge disk 30 is rotated back into realignment with the hub 26, via engagement between the apertures 51 and the projections 108, in response to the breaker ring 100 being slid to the extended position.

FIG. 2A illustrates the wedge clutch 20 in an engaged state with the breaker ring 100 in the retracted position. The clutch 20 may be disengaged by driving the breaker ring 100 towards the wedge disk 30 and into the extended position as shown in FIG. 2B. The breaker ring 100 may be driven by an actuator (not shown) such as a hydraulic piston, an electromagnet, a servo motor, or other means known in the art. Some of the slanted sides 114 engage respective apertures 51 to rotate the wedge disk 30 relative to the hub 26 in response to the breaker ring 100 moving to the extended position. The clutch 20 is configured such that the cammed profiles 60, 66 realign when the breaker ring 100 reaches the extended position. The hub 26 may be simultaneously retracted to facilitate disengagement of the clutch 20, but this is not required. For example, it may be advantageous to not actuate the hub 26 in situations where the clutch 20 is being disengaged for a short amount of time as this reduces the time required to re-engage the clutch 20. Not retracting the hub 26, however, increases losses within the clutch 20 and places higher stresses on the clutch components. As such, it is advantageous to retract the hub 26 when the clutch 20 is being disengaged for an extended period of time.

The breaker ring 100 may be used as a torque-limiting device in addition to disengaging the clutch 20. Inherent to the design of the clutch 20, the wedge disk 30 and the hub 26 rotate to further misalign the cammed profiles 60, 66 as clutch torque increases. Thus, torque capacity of the clutch 20 depends upon the permitted rotation of the wedge disk 30 relative to the hub 26. The projections 108 of the breaker ring 100 may be sized to engage with the apertures 51 at a torque limit to prevent further rotation of the wedge disk 30, thus limiting the clutch capacity to a desired maximum.

This disclosure is not limited to the illustrated embodiments that show the carrier as the outer race and the hub as the inner race. In other embodiments, the placement of the hub and carrier are switched with the carrier being the inner race and the hub being the outer race. Here, the inner edge of the disk engages with a groove defined in the inner race, and the outer edge of the disk is disposed on the ramped surface of the outer race. Applicant's co-pending application, U.S. Ser. No. 15/388,395 filed on Dec. 22, 2016, describes an example of this type of wedge clutch, and U.S. Ser. No. 15/388,395 is incorporated in its entirety by reference herein.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

What is claimed is:

1. A clutch comprising:
a hub;
a carrier defining a circular groove;
a wedge disk defining apertures and including a first edge disposed on the hub and a second edge disposed in the groove; and
a breaker ring encircling the hub and including projections that are each received in one of the apertures, each of the projections having at least one slanted side, wherein the breaker ring is slidably connected to the hub and is configured to rotate the wedge disk relative to the hub, via engagement between the projections and the apertures, in response to the breaker ring sliding towards the wedge disk.

2. The clutch of claim 1, wherein the breaker ring includes inner and outer surfaces and a face extending therebetween, wherein the projections extend axially from the face.

3. The clutch of claim 1, wherein each of the projections includes a base and a tip, and the slanted side extends from the tip to the base such that the tip is narrower than the base.

4. The clutch of claim 1, wherein each of the projections includes a tip and a base that is wider than the tip.

5. The clutch of claim 4, wherein, for at least one of the projections, the tip is narrower than a corresponding one of the apertures and the base is wider than the corresponding aperture.

6. The clutch of claim 1, wherein the apertures are slots that are elongated in a radial direction of the wedge disk.

7. The clutch of claim 1, wherein the breaker ring is splined to the hub.

8. The clutch of claim 1, wherein the hub defines radially extending ramps and the first edge defines lobes that cooperate with the ramps to radially actuate the wedge disk in response to relative rotation between the hub and the wedge disk.

9. The clutch of claim 8, wherein the hub has a tapered surface and the radially extending ramps are formed on the tapered surface.

10. A clutch comprising:
an inner race;
an outer race concentric with the inner race, wherein one of the inner and outer races defines a tapered surface and the other of the inner and outer races defines a circular groove;
a wedge disk radially disposed between the inner and outer races and including a first edge disposed on the tapered surface and a second edge disposed in the groove, wherein the wedge disk defines apertures; and
a breaker ring concentric with the inner and outer races, rotationally synced to the inner race, and axially movable relative to the inner race between a retracted position and an extended position, the breaker ring including a face and projections axially fixed to and extending from the face, wherein each of the projections have at least one slanted side, and wherein the apertures and the projections are sized such that the slanted sides are in contact with the wedge disk when in the extended position and are not in contact with the wedge disk when in the retracted position.

11. The clutch of claim 10, wherein the projections extend axially from the face.

12. The clutch of claim 10, wherein the face extends radially.

13. The clutch of claim 10, wherein the outer race defines the groove and the inner race defines the tapered surface.

14. The clutch of claim 10, wherein the breaker ring includes an inner surface that is splined to an outer surface of the inner race.

15. The clutch of claim 14, wherein the tapered surface defines radially extending ramps and the first edge defines lobes that cooperate with the ramps to radially actuate the wedge disk in response to relative rotation between the inner race and the wedge disk.

16. A clutch comprising:
a hub defining radially extending ramps;
a carrier defining a circular groove;
a wedge disk radially disposed between the hub and the carrier and including an inner edge seated on the hub, an outer edge disposed in the groove, and apertures, the inner edge defining lobes configured to nest with the ramps when the wedge disk and the hub are rotationally aligned and to engage with the ramps to radially expand the wedge disk from a contracted position, in which the clutch is disengaged, to an expanded position, in which the clutch is engaged, when the wedge disk and the hub are rotationally misaligned; and
a breaker ring encircling the hub and including projections that have a tip and a base that is wider than the tip and that are each receivable in one of the apertures, wherein the breaker ring is axially movable relative to the wedge disk between a retracted position and an extended position in which the projections engage with the wedge disk to rotate the wedge disk to the contracted position.

17. The clutch of claim 16, wherein the hub is rotationally fixed to the breaker ring.

18. The clutch of claim 16, wherein each of the projections includes at least one slanted side extending between the tip and the base.

19. The clutch of claim 16, wherein the wedge disk defines radially extending slots and the projections are received in the slots.

\* \* \* \* \*